United States Patent [19]
Kirby et al.

[11] Patent Number: 5,466,094
[45] Date of Patent: Nov. 14, 1995

[54] METHOD OF SETTING, RESETTING AND PROTECTING POLES IN THE GROUND WITH FOAM POLYURETHANE RESINS

[75] Inventors: Norman R. Kirby, Alvin; Richard S. Schmidt, Houston, both of Tex.

[73] Assignee: Forward Enterprises, Houston, Tex.

[21] Appl. No.: 180,951

[22] Filed: Jan. 13, 1994

[51] Int. Cl.$^6$ ........................................................ F02D 7/00
[52] U.S. Cl. .............................. 405/232; 52/170; 52/514; 405/231; 405/303
[58] Field of Search ................................. 405/232, 229, 405/231, 237, 303; 52/170, 514, 515; 521/159, 155; 528/59, 67, 77

[56] References Cited

U.S. PATENT DOCUMENTS

| | | |
|---|---|---|
| 2,915,496 | 12/1959 | Swart et al. . |
| 3,226,344 | 12/1965 | Schwartz et al. . |
| 3,344,871 | 10/1967 | Goodman .................................. 175/19 |
| 3,403,520 | 10/1968 | Goodman . |
| 3,564,859 | 2/1971 | Goodman . |
| 3,611,736 | 10/1971 | Goodman . |
| 3,706,680 | 12/1972 | Booth . |
| 3,805,532 | 4/1974 | Kistner . |
| 3,830,760 | 8/1974 | Bengston . |
| 3,846,347 | 11/1974 | Satterly .................................... 521/159 |
| 3,968,657 | 7/1976 | Hannay . |
| 4,248,975 | 2/1981 | Satterly .................................... 521/110 |
| 4,299,751 | 11/1981 | Born . |
| 4,314,962 | 2/1982 | Wollensak et al. .................. 264/328.6 |
| 4,424,333 | 1/1984 | O'Connor et al. ........................ 528/75 |
| 4,439,577 | 3/1984 | O'Connor et al. ....................... 524/425 |
| 4,966,497 | 10/1990 | Kirby ..................................... 405/232 |

OTHER PUBLICATIONS

"Polyiso Board Foamers Scramble for F–11 Alternatives" *Plastics Today*, p. 9 (Jan. 7, 1989).
"Flexible Foamers to Drop F–11 by Year 2000", *Plastics Today*, p. 6 (Mar. 18, 1989).
Burns, Robert "Urethane Manufacturing Prepares for Life Without CFC's" *Plastics Technology*, pp. 55–63 (Dec. 1988).
"Silicone Rubber Foam Poised to Challenge Polyurethane" *Plastics Technology*, pp. 15–17 (Nov. 1988).
Berins, Mike "NewsWatch" *Plastics World*, p. 11 (Sep. 1988).
"How Urethane Foamers Will Learn to Live Without CFC's" *Plastics Technology*, p. 13 (Aug. 1988).
"New Urethane Foam System Needs No CFC's" *Plastics Technology*, p. 13 (Sep. 1988).
"Flexible PUR Foam Technology Reduces need for CFC's" *Plastics Technology*, p. 14 (Jan. 1989).
"Structural Plastics Makers to Review New Technology" *Plastics Today*, p. 5 (Mar. 4, 1989).

*Primary Examiner*—Dennis L. Taylor
*Attorney, Agent, or Firm*—Fulbright & Jaworski

[57] ABSTRACT

An improvement in the known method of setting or resetting poles in the ground or ground line protection of encapsulation of pole treatment chemicals in the ground and enhancement of the strength, density, ratio of foam polyurethane resins formed in-situ from polyisocyanate and resin reactive therewith. Ground water and detrimental natural soil chemicals are often encountered in pole setting and affect polyurethane foam formation by undesirably reacting with the polyurethane to give a foam of insufficient density and strength. This improvement comprises stabilizing the highly reactive isocyanate component by pre-reacting to form a prepolymer. This composition decreases the cost per unit of foam per pole installation. There is also the method for the addition to the polyurethane composition of various repellant materials and preservative agents for the pole.

6 Claims, No Drawings

METHOD OF SETTING, RESETTING AND PROTECTING POLES IN THE GROUND WITH FOAM POLYURETHANE RESINS

FIELD OF THE INVENTION

The present invention relates generally to a method of setting or resetting poles in the ground using rigid foam polyurethane resin. It more particularly relates to the improvement of setting poles in a wet environment using a more stable, non-volatile water-immiscible material without a halogenated hydrocarbon blowing agent.

BACKGROUND OF THE INVENTION

This invention is an improvement in known methods of setting, or resetting poles in the ground, ground line protection of poles or encapsulation of pole treatment chemicals and enhancement of the strength to density ratio, of rigid foam polyurethane resins formed in-situ from polyisocyanate and resin reactive therein. Ground water and detrimental natural soil chemicals are often encountered in pole setting and these affect polyurethane foam formation by undesirably reacting with the polyisocyanate to give a foam of insufficient density and strength.

The present invention is an improvement in the invention disclosed in U.S. Pat. Nos. 3,968,657 to Hannay, 3,564,859 to Goodman, 3,403,520 to Goodman, and 4,966,497 to Kirby which describe related methods for resetting poles with foam plastic. The entire disclosures of U.S. Pat. Nos. 3,968,657, 3,564,859, 3,403,520, and 4,966,497 are incorporated herein by reference.

In brief, U.S. Pat. No. 3,403,520 describes a method of setting pole forms in the ground by making a hole which is only slightly larger than the butt of the pole to be placed in the hole, placing the pole in the hole in the desired position, partially filling the hole with a reactive component mixture with a synthetic resin and a blowing agent and permitting the reaction to complete so as to expand the resinous foam into all the space between the pole and the sides of the hole. The expanded resinous foam adheres to and seals to the lower end of the pole protecting it from moisture, chemicals and rodents and sets the pole in the hole. The expanding resinous foam fills all the voids, surfaces, crevices and notches in the sides and bottom of the hole.

U.S. Pat. No. 3,564,859 describes a procedure for straightening and refilling the hole. It utilizes the same method as U.S. Pat. No. 3,403,520 for producing foam and for filling voids resulting when an existing installed pole has been realigned after it has been canted or tilted.

U.S. Pat. No. 3,968,657 was an improvement upon these methods using the addition of a non-volatile water-immiscible material to the mixture so that properties of the resultant product are not affected excessively in the presence of groundwater.

U.S. Pat. No. 4,966,497 describes a procedure that is an improvement on the above methods because halogenated hydrocarbon blowing agents, more particularly chlorofluorocarbons, are not required. Further, the composition decreased the cost per unit of the polyurethane foam.

The present invention decreases the cost per unit of foam pole installation, and improves its storage stability and reaction reliability, yet maintains the advantageous physical characteristics of previous methods.

SUMMARY OF THE INVENTION

An object of the present invention is an improved method for setting and resetting poles in soil with foaming polyurethane without using a halogenated compound as a blowing agent and decreasing the cost per unit of foam pole installation while retaining the physical characteristics of previous methods.

Thus, in accomplishing the foregoing object, there is provided in accordance with one aspect of the present invention the method of setting and resetting poles in the earth and encapsulation of pole treatment chemicals by forming a foamed polyurethane composition in situ, the improvement comprising the step of mixing a first component and a second component for an appropriate time and at an appropriate temperature to form a composition, wherein the first component is comprised of polyisocyanate, a stoichiometric deficiency of an organic active hydrogen-containing component, a liquid hydrocarbon, and a non-aromatic hydrocarbon-compatible solvent; and the second component is comprised of an amine phenolic or polyetherpolyol or a combination thereof, a non-ionic surfactant, and a catalyst and a blowing agent; and wherein the composition has a density of 3.5 to 4.5 pounds per cubic foot and a compression of at least approximately 65-75 PSI.

In one embodiment, the composition is formed by combining, at an appropriate time and temperature, nine or ten parts of the first component, comprised of 60-80% 4,4' diphenylmethane diisocyanate, 10-25% petroleum hydrocarbon ESCOPOL A-135, 4-8% dibasic ester (DBE), and 9-11% silicon glycolcopolymer DOW Polyglycol E400; with one part of the second component, which is pre-mixed at an appropriate time and temperature, and is comprised of 70-90% DOW Polyglycol E200, 5-8% catalyst K15, 5-25% surfactant DC 193, and 4-9% water.

In a more preferred embodiment, the composition is formed by mixing ten or eleven parts of the first component which has reacted for 3 hours at ambient temperature or for 1 hour at 160° F., wherein the first component consists of 67%-70% 4,4' diphenylmethane diisocyanate, 15%-19% petroleum hydrocarbon ESCOPOL A-135, 4.8%-6% DBE, and 9%-10% glycolcopolymer DOW Polyglycol E400; and wherein the second component, which is pre-mixed for 1 hour prior to the addition of component 1, consists of 81%-83% DOW Polyglycol E200, 5%-7% catalyst K15, 5%-7% surfactant DC193, and 5%-6% water.

The other and future objects, features and advantages will be apparent from the following description of the presently preferred embodiments of the invention given for the purpose of disclosure.

DETAILED DESCRIPTION

It is readily apparent to one skilled in the art that various substitutions and modifications may be made to the invention disclosed herein without departing from the scope and spirit of the invention.

This invention is an improvement on the solution to the problem of forming a polyurethane form in-situ in the presence of large amounts of water without the use of a halogenated hydrocarbon as blowing agent. This method provides an improvement in the known methods for setting and resetting poles in the ground with a polyurethane foam where ground water is encountered and without using the normal blowing agents which are usually composed of halogens.

This composition decreases the cost per unit of foam per pole installation by retaining the advantageous physical characteristics of other compositions while lowering the amount of material per cubic foot.

When making foams, for the setting of poles or resetting of poles, it is important that the foam have certain characteristics and densities. The foam of the present invention has a density of about 3.5 to 4.5 pounds per cubic foot and a compressive strength of at least about 65–75 pounds per square inch. When mixtures do not contain halogenated fluorocarbons, it is a major problem to form this composition and to obtain sufficient density to strength ratios. Although U.S. Pat. No. 3,968,657 teaches that blowing agents responsible for foam formation can be any of the agents known in the art and that water is preferred, it is also known that in most applications some of the water will have to be replaced with a volatile halogenated hydrocarbon such as freon in order to obtain faster foam formation and to produce a foam of less density or increased tensile compression strength. The present application is an improvement on Kirby U.S. Pat. No. 4,966,497 which describes a method for forming a composition which does not use halogenated hydrocarbons such as Freon.

The present invention is an improvement on a method of setting poles, resetting poles, ground line protection of poles, encapsulation of pole treatment chemicals or the like with a foam polyurethane composition wherein the improvement comprises the step of mixing a first component and a second component for an appropriate time and at an appropriate temperature to form a composition, wherein the first component is a prepolymer comprised of polyisocyanate, an organic active hydrogen-containing component, a glycolcopolymer, and an aromatic-compatible solvent, and the second component is comprised of an amine phenolic or polyetherpolyol or a combination thereof, a non-ionic surfactant, and a catalyst and water; and wherein the composition has a density of 3.5 to 4.5 pounds per cubic foot and a compression strength of at least approximately 65–75 PSI.

The composition of the present invention utilizes conventional materials such as polyisocyanate and reactive resin compounds, but also includes a water-immiscible component and a catalyst. The water-immiscible component can be any of a large number of materials or even mixtures of materials. Preferably the water-immiscible component is a liquid having a low vapor pressure which is substantially non-reactive under the usual conditions of foam formation with either the resin or the polyisocyanate components used to form the polyurethane compositions.

Although materials which react with either or both of the polyurethane components are by no means excluded and may comprise part of the water-immiscible component, non-reactive immiscible components are preferred because of economic reasons. If the water-immiscible component is more reactive than the resin with the polyisocyanate, an increased amount of polyisocyanate is needed for its essential functions of providing carbon dioxide by reaction with water and its solid resin forming function by reaction with the liquid resin. Since polyisocyanate is usually the most costly component of the polyurethane forming system, it is desirable to keep this component at a minimum.

Although not completely essential, another important characteristic of water-immiscible components is that they have low vapor pressures and are relatively non-volatile. Low vapor pressure means that the component has a vapor pressure lower than water at ordinary temperature and usually is a vapor pressure less than 20 mm Hg. In the preferred embodiment the vapor pressure is usually about 0 mm Hg at 100° F.

"Water-immiscible" means that the solubility in water at about 70° F. is less than about 5 grams per 100 grams of water and preferably less than about 1 gram per 100 grams of water. In a preferred embodiment, the water-immiscible component has no measurable solubility in water. Among the water-immiscible components are those described in U.S. Pat. No. 3,968,657 which is incorporated herein by reference.

The added water-immiscible component necessary to this invention is to be distinguished from the usual essential components of a polyurethane foam system, namely polyisocyanate and resin which are normally water-immiscible in themselves. As indicated above, it is preferred that the water-immiscible component be non-reactive with the essential polyurethane components. Once this preference is satisfied, the ratio of water-immiscible components to the remainder of the polyurethane foam forming composition is not critical. The essential considerations for selecting appropriate proportions are that enough of the water-immiscible component be present to inhibit the reaction with water and that excesses or incompatibility of the water-immiscible component which result in unacceptable deterioration of the physical characteristics of the final foam be avoided.

The glycolcopolymer can be selected from a variety of products. In the preferred embodiment dimethicone copolyol is used. An example of this is Dow Corning's surfactant, E400.

Dow E400 is water soluble and gives stable foams.

Blowing agents for foam formation are known in the art. The present invention uses non-halogenated compounds to give a fast foam formation as well as to produce the necessary density and strength. The water-immiscible additive is an aromatic petroleum hydrocarbon agent Exxon product ESCOPOL A-135, which is a blend of hydrocarbons from petroleum refining.

Catalysts are also known in the art and are important in facilitating the foaming reaction. In the preferred embodiment a low molecular weight polyglycol catalyst is used. For example, DOW E200. An important characteristic of a catalyst is the foam formation time sequence. The sequence involves control of the reaction times to regulate the mix of material and the gel process. To maintain the specific strength for complete expansion, both the first and second components of the present invention are pre-mixed at an appropriate time and temperature before the components are mixed together. The pre-mixing allows for suitable foaming when the components are subsequently mixed together. The rise and skin time end just before the expansion time is completed. Thus, the rise and skin times end at approximately 140 seconds. The exotherm expansion time starts at about 30 seconds and finishes at about 150 seconds.

It is also known in the art of preparing plastic foams that solid extenders and solid fillers can be advantageously used to reduce cost and achieve desirable characteristics. The use of such fillers and extenders consistent with the obtaining of the necessary foam characteristics is contemplated in this invention. Indeed, solid fillers or extenders which serve to reduce corrosion of metals, reduced rotting and termite infestation of wood, can be highly beneficial. On the other hand, fillers and extenders which tend to be corrosive in themselves are to be avoided. Corrosion problems are often quite complex and depend not only on the exact nature of the metal but also on the precise mechanism of corrosion. Accordingly, the choice of inhibitor will depend on many factors.

EXAMPLE

The foamable compositions utilized in the present invention can vary with the requirements mentioned above. The following is representative of such formulations in which all parts are by weight.

|  | Range Preferred |
|---|---|
| Component 1: | |
| 4,4' diphenylmethane diisocyanate | 67% |
| Petroleum hydrocarbon ESCOPOL A-235 | 19% |
| DBE | 4.8% |
| Silicon glycolcopolymer Dow E400 | 9.2% |
| Component 2: | |
| DOW E200 | 83% |
| Catalyst K15 | 5% |
| Surfactant DC193 | 6% |
| Water | 5% |

One skilled in the art will readily appreciate that the present invention is well adapted to carry out the objects and attain the ends and advantages mentioned as well as those inherent therein. Compounds, methods and procedures and techniques described herein are presently representative of the preferred embodiments, are intended to be examples and are not intended as limitations on the scope. Changes therein and other uses will occur to those skilled in art which are encompassed within the spirit of the invention and defined by the scope of the appended claims.

What is claimed is:

1. In the method of setting and resetting poles in the earth and encapsulation of pole treatment chemicals or the like by positioning the poles and forming a foamed polyurethane composition in situ around the poles, the improvement comprising: the step of forming the foamed polyurethane composition in situ by mixing a first component and a second component for an appropriate time and at an appropriate temperature, wherein the first component is comprised of:

polyisocyanate;

an organic active hydrogen-containing component;

a liquid hydrocarbon; and a hydrocarbon compatible solvent;

and the second component is comprised of:

an amine phenolic or polyetherpolyol or a combination thereof, a non-ionic surfactant;

a catalyst; and a blowing agent;

wherein the composition has a density of 3.5 to 4 pounds per cubic foot and a compressive strength of at least approximately 65 to 75 PSI.

2. The method of claim 1, wherein said composition is formed by combining:

ten or eleven parts of the first component, comprised of 60–80% 4,4' diphenylmethane diisocyanate, 10–25% petroleum hydrocarbon ESCOPOL A-135, 4–8% DBE, and 9%–10% glycolcopolymer DOW Polyglycol E400, with one part of the second component, comprised of 70–90% DOW Polyglycol E200, 5–8% catalyst K15, 5–25% surfactant DC 193, and 4– 9% water.

3. The method of claim 2, wherein the first component is comprised of 67% 4,4' diphenylmethane diisocyanate, 19% petroleum hydrocarbon ESCOPOL A-135, 4.8% DBE, and 9.2% silicon glycolcopolymer DOW Polyglycol E400, and the second component is comprised of 83% amine phenolic DOW Polyglycol E200, 5% catalyst K15, 6% DC193, and 5% water.

4. The method of claim 1, wherein the first component is prepared by mixing the components for 3 hours at ambient temperature or for 1 hour at 160° prior to addition of the second component 2.

5. The method of claim 1, wherein the second component is prepared by mixing the components for 1 hour prior to the addition of the first component.

6. In the method of setting and resetting poles in the earth and encapsulation of pole treatment chemicals or the like by positioning the poles and forming a foamed polyurethane composition in situ around the poles, the improvement comprising: the step of forming the foamed polyurethane composition in situ by mixing ten parts of the first component to one part of the second component, wherein the first component is comprised of:

67% 4,4' diphenylmethane diisocyanate,

19% petroleum hydrocarbon ESCOPOL A-135, 4.8% DBE, and 9.2% silicon glycopolymer DOW E400, and is mixed for 3 hours and ambient temperature or for 1 hour at 160° F. prior to the addition of the second component, and wherein the second component is pre-mixed for 1 hour prior to the addition of the first component and is comprised of:

83% DOW Polyglycol E200,

5% catalyst K15,

6% surfactant DC193, and 5% water; and wherein the compound has a density of 3.5 to 4.5 pounds per cubic foot and a compressive strength of at least approximately 65 to 75 PSI.

\* \* \* \* \*